UNITED STATES PATENT OFFICE.

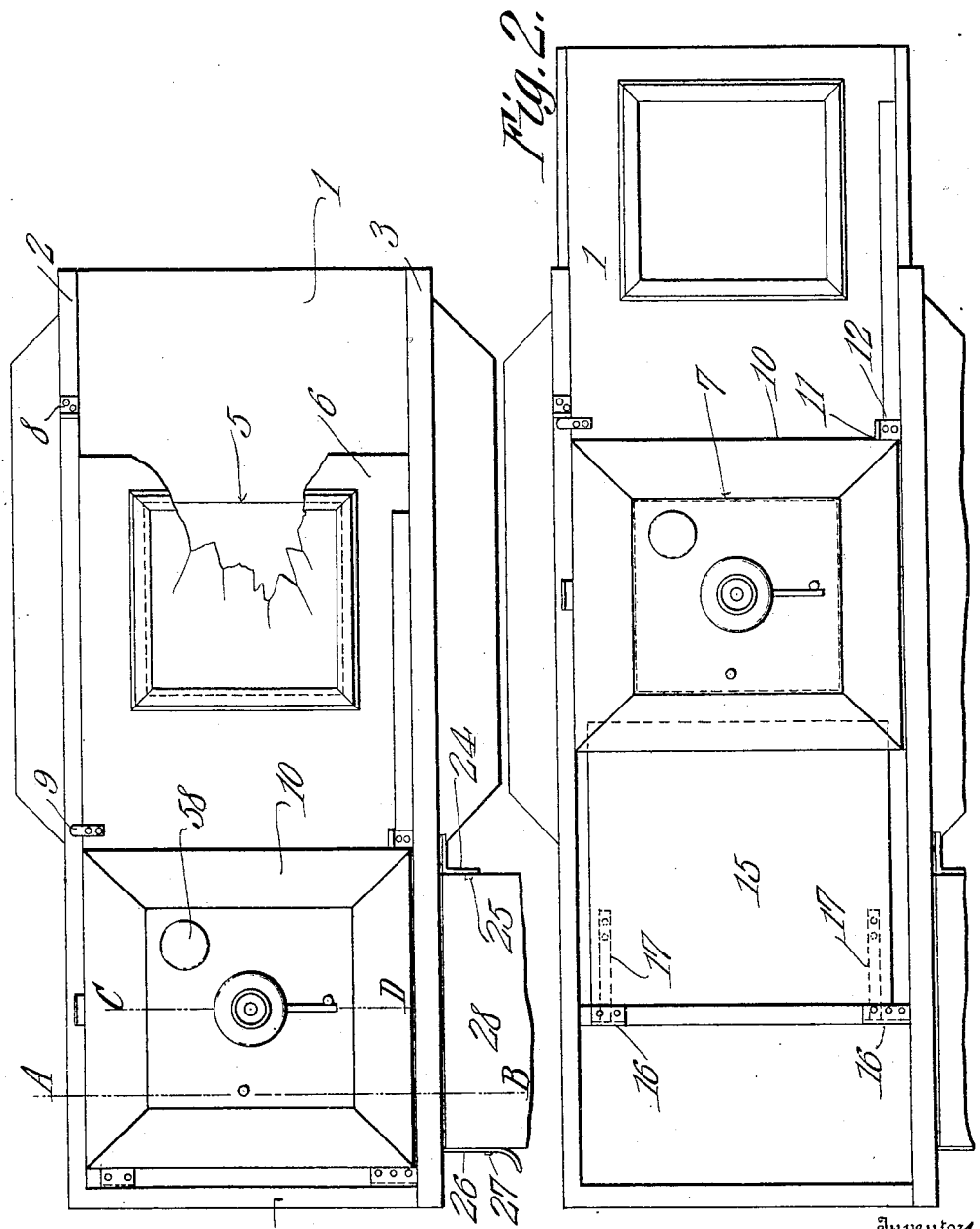

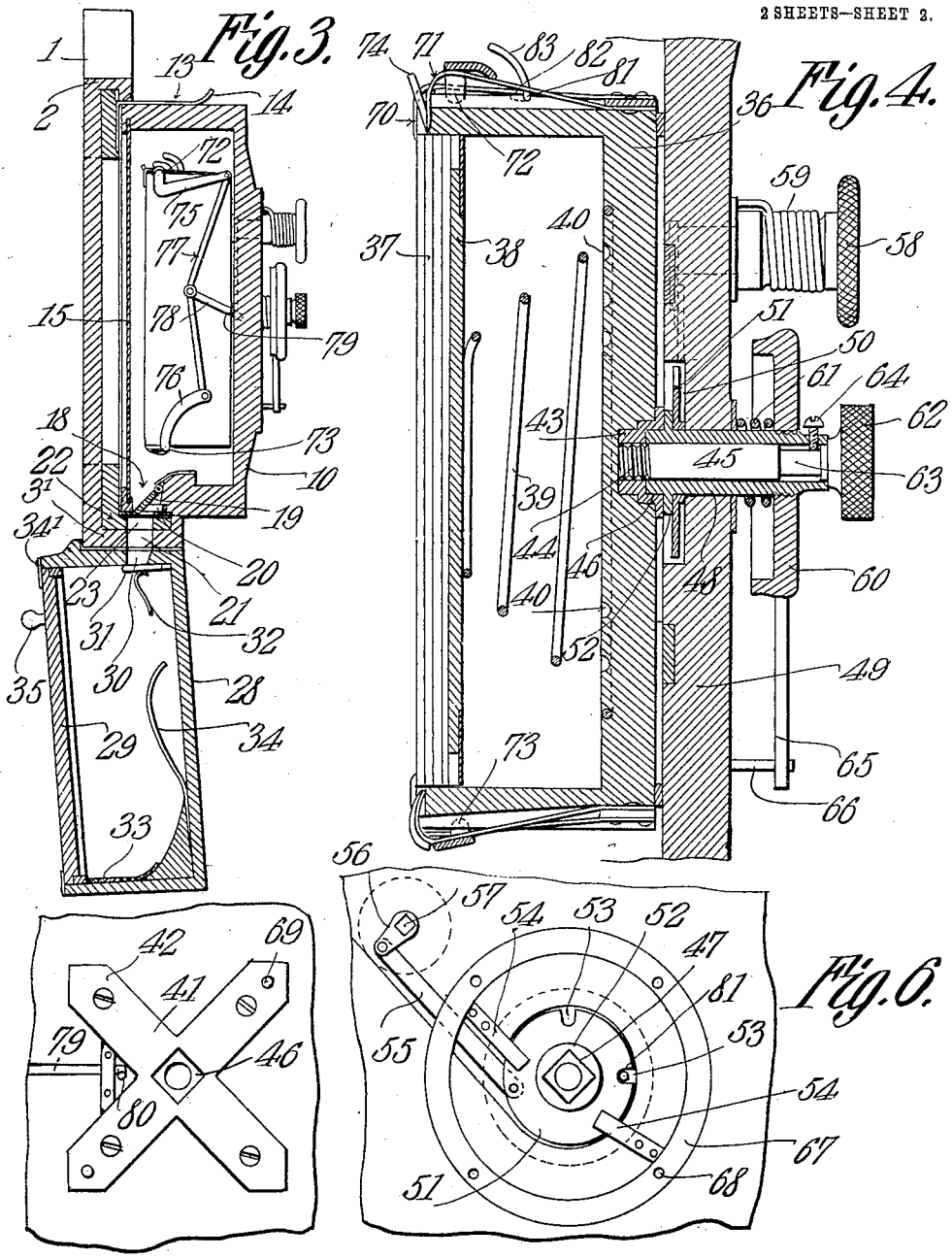

ROBERT J. LONDON AND JAMES A. LONDON, OF FREDERICKTOWN, MISSOURI.

MAGAZINE PLATE-HOLDER FOR PHOTOGRAPHIC CAMERAS.

No. 926,662.             Specification of Letters Patent.             Patented June 29, 1909.

Application filed July 30, 1908. Serial No. 446,158.

*To all whom it may concern:*

Be it known that we, ROBERT J. LONDON and JAMES A. LONDON, citizens of the United States, residing at Fredericktown, in the county of Madison, State of Missouri, have invented new and useful Magazine Plate-Holders for Photographic Cameras, of which the following is a specification.

This invention has reference to improvements in magazine plate holders for photographic cameras especially that type of camera known as a portrait camera.

The present invention has reference more particularly to improvements in photographic cameras of the type shown and described in our Letters Patent, No. 794,992, issued July 18, 1905, in which patent there is described a plate holder for cameras capable of carrying a number of sensitive plates which may be exposed one at a time, and moved successively out of the field of the lens into a light tight receptacle, thus avoiding the necessity of providing a plate holder for each plate or pair of plates used, the device being capable of accommodating a comparatively large number of plates at one time, say as many as a dozen plates at once.

In the structure of the aforesaid Letters Patent there is provided a dark box which may be attached to and readily removed from the plate holder, and as each plate is exposed to the impress of the light image, it is transferred to the dark box without being exposed to any other light than that intentionally striking it from the lens, and after all the plates have been exposed and transferred to the dark box, the latter may be detached from the plate holder and carried to a suitable dark room for development. The plate holder is of the magazine type so that a large number of pictures may be taken without the necessity of refilling said plate holder.

The present invention will be best understood from a consideration of the following detail description taken in connection with the accompanying drawings forming a part of this specification, in which drawings, Figures 1 and 2 are rear face views of a portrait camera with the improvement applied thereto, and showing different phases of operation. Fig. 3 is a vertical section on the line A—B of Fig. 1. Fig. 4 is a vertical section on the line C—D of Fig. 1 on a larger scale than the other figures. Figs. 5 and 6 are detail views of adjacent coacting parts of the plate holder generally and the rotatable plate carrier mounted therein.

Referring to the drawings, there is shown a back board 1 of a camera of the portrait type, but of course it is to be understood that the invention is not necessarily limited to portrait cameras, since it is applicable to any type of camera. The back board is made with a top channel strip 2 and a bottom channel strip 3 for guiding the sliding members that are fitted to the back. At one end the back board is provided with a vertical strip 4 acting as a stop for the sliding member. The back board 1 is provided with the usual opening 5 in the optical axis of the lens for the passage of the light from the lens to the sensitive plate.

Mounted on the back board so as to slide in the channels 2 and 3 is a sliding board or member 6, having near one end an opening covered by the usual ground glass plate 7, which may be brought into the focal plane of the lens for the purpose of properly focusing the picture, as is customary in portrait and other cameras. The ground glass is located near one end of the board 6 and near the other end the board is provided with a similar opening indicated by the dotted lines 7 in Fig. 2. Fast upon the exterior of the channel 2 is a stop bracket 8 and fast on the sliding board 6 is a finger 9 in the path of which the bracket 8 is located, the arrangement being such that when the sliding board is moved to the left as viewed in Fig. 1, the movement is limited by engagement with the end strip 4, and when the sliding board is moved toward the right, as viewed in Fig. 1, its movement in that direction is limited by the engagement of the finger 9 with the bracket 8. When the board 6 is moved to the extreme limit of its travel toward the left then the ground glass plate 7 is back of the opening 5, and when the board 6 is moved to the extreme limit of its travel toward the right, then the opening 7 is coincident with the opening 5.

Carried by the end of the board 6 through which is formed the opening 7, is a box 10 substantially square in outline and of a depth sufficient for the purposes which will presently be referred to. This box is provided at one side near the lower end with a pin 11 arranged to engage in a bracket 12, while on the upper end of the box is a pin 13 arranged to extend through a snap plate 14, so that the box 10 may be secured to the board 6 or removed bodily therefrom. The box 10 when in place on the board 6 covers the opening 7. The box 10 is in effect a plate holder, but is so constructed as to carry a stack of plates, and may be loaded with from one plate up to say a dozen or more plates. The box 10 is fitted with an opaque slide 15 similar to the slides of ordinary plate holders so that light may be prevented from entering the face of the box coincident with the opening 7 when the box is mounted on the board 6, and also when the box is removed therefrom, it being understood that that face of the box which, when the box is secured on the board is coincident with the opening 7, is not closed in but is only closed by the slide 15.

Fast on the rear face of the back board 1 near the end carrying the strip 4 are two spaced spring tongues 17 and the corresponding end of the slide 15 is provided with angle brackets 16, which when the board 6 is moved toward the right as viewed in Fig. 1, are engaged by the spring tongues 17, which spring away from the board 1 when relieved of the pressure of the board 6, and are then in the path of the brackets 16. The purpose of this is to engage the slide 15 as the board 6 is moved to bring the box 10 and opening 7 coincident with the opening 5, and so hold the slide 15 against movement so that it is withdrawn from the box 10 and light passing through the lens and through the opening 5 will reach the interior of the box 10. The box 10 may for convenience of description be referred to as a plate holder and it is in fact a magazine plate holder, which may be removably attached to the back of the camera.

The box or plate holder 10 has formed in its lower side or edge and closely adjacent to the slide 15, a through slot 18 as long or longer than the longest side of the largest plate designed to be used in the plate holder. This slot is normally closed by a door 19 hinged at one edge to one wall of the slot 18, and normally held in the closed position by a suitable spring 20. It will be understood that wherever necessary, suitable felt lining is used to exclude light and to protect the sensitive film of the plate. The channel 3 is also provided with a through slot 21 coincident with the slot 18 when the plate holder is in position on the board 6, and the latter is in the extreme limit of its travel toward the end 4 of the board 1, and the said board 6 is also provided with a ledge 22 engaging in the channel of the channel strip 3, and this ledge is provided with a through slot 23, at all times matching the slot 18 when the plate holder is fast to the board 6 and matching the slot 21 when the board is at the extreme point of its travel toward the end 4.

At one end of the slot 21, and fast on the under side of the channel strip 3 is an angle bracket 24 having a stud 25 projecting therefrom, and at the other end of the slot 21, and fast on the under side of the channel strip 3 is a spring plate 26 suitably perforated to receive a pin 27 projecting from a box 28, which latter on the side remote from the pin 27 is provided with a socket for the reception of the stud 25.

The box 28 is closed at all sides, one side 29 however, being removable, and this box as will hereinafter appear constitutes a dark box for the reception of exposed plates. This box when held by the bracket 24 and snap plate 26, is supported immediately below the slot 21 in the channel strip 3, and through the corresponding end of the box there is a slot 30 matching the slot 21 in the said channel strip 3. The slot 30 is normally closed by a door or valve 31 hinged to the inner wall of the top end of the box 28, and held normally closed by a suitable spring 32. The bottom of the box may have a cushioning layer 33 of felt or other soft material, and leaf springs 34 are provided for a purpose which will presently appear, said leaf springs being interior to the box and curved toward and then away from the removable side or lid 29. This lid is stepped or otherwise secured in the box and a pivoted catch 34' serves to hold it in place against accidental removal. To facilitate the removal of the lid it may be provided with a handle 35.

Contained within the plate holder 10 is a plate magazine 36 in the shape of a box of appropriate shape and of sufficient depth to receive and hold a stack of sensitive plates, some of which are indicated at 37. Within the box is a follower 38 arranged to engage the innermost one of the stack of plates 37, and this follower is constantly urged toward the open end of the box by a suitable spring 39, which latter is in the form of a helix so that when compressed it will take up practically no room, and when in the compressed condition the coils may enter a helical groove 40 formed in its path on the inside of the box 36.

Secured to the outer face of the back of the box 36 in a central position thereon, is a plate 41, which may be made of suitable size or for the purpose of reducing material may be simply made of cross-arms 42, the arms crossing each other at right angles and merging at the point of junction. At the center of the plate 41 is a boss 43 formed with screw threads for the reception of the threaded end 44 of a rod 45 to which reference will presently be made. The face of the plate 41 coincident with the boss 43 is counter-sunk as shown at 46, the counter-sink entering the boss. This counter-sunk portion is square or similarly shaped to receive the like shaped end 47 of a sleeve 48 extending through the back 49 of the plate holder box 10, the said sleeve 48 receiving the rod 45 before referred to. The inner face of the back 49 immediately surrounding the sleeve 48 is counter-sunk as shown at 50, and housed in this counter-sunk portion is a disk 51 mounted for rotation upon the sleeve 48, the said disk 51 being held to said sleeve by a flange 52 formed on said sleeve and between which and the bottom of the counter-sink 50 the disk 51 is confined. The disk 51 is provided with two peripheral recesses 53 spaced apart by 90°. The disk 51 is further held in the recess 50 by fingers 54 fast on the corresponding face of the member 49 and over-lying the said disk 51. The disk 51 is connected near one edge to a link 55 the other end of which is connected to the free end of a crank 56 carried by a rock shaft 57 extending through the back member 49 of the plate holder 10, and exterior thereto being provided with a manipulating hand wheel 58. The stem of the hand wheel 58 may be surrounded by a spring 59 so that the shaft 57 has a normal tendency to maintain a certain position against which spring the shaft 57 is rotated in order to impart rotative movement to the disk 51.

The sleeve 48 extends beyond the outer face of the back member 49 and is there threaded to receive a hand wheel 60 spaced a short distance from the outer face of the back member 49, and between the hand wheel 60 and the face of the member 49 the sleeve 48 is surrounded by a helical spring 61, the tendency of which is to force the hand wheel 60 away from the face of the member 49. The rod 45 extends beyond the outer end of the sleeve 48, and is there provided with a head 62 by means of which the rod 45 may be readily turned on its longitudinal axis. To permit a certain longitudinal movement of the rod 45 in the sleeve 48, the said rod is provided with an exterior groove 63 within the confines of the sleeve 48, and this groove is entered by a set screw 64 extending through the wall of the sleeve 48. This permits the rotative movement of the rod 45 and certain longitudinal movement thereof, thus allowing for the screwing into and out of boss 43 of the threaded end 44 of the said rod. The manipulating member 62 as well as the hand wheel 60 and other hand wheel 58 may be appropriately milled to facilitate the turning of these members. The hand wheel 60 is provided with a radially extending pin 65 in the path of which are two spaced stop pins 66 90° apart.

Concentric with the axis of the pin 45 and seated in the inner face of the back member 48 of the plate holder 10 is a ring 67 provided with four equi-distantly disposed holes or recesses 68.

At the extremity of two of the oppositely disposed arms 42 of the plate 41 are pins 69 adapted to engage in either diametric pair of recesses 68 in the ring 67, so that the plate receiving box 36 may be set in either of two positions at right angles one to the other. The arrangement is such that when the plate holder is in the camera, one position of the plate box 36 will present the plates to the lens with the long sides of the plates vertical, while in the other position the short sides of the plates are vertical and the long sides are horizontal. As most photographic plates are made with one side longer than the other, this permits photographs to be taken on a plate with the same either vertical or horizontal with reference to the longer side. To effect the change of position of the plates, the hand wheel 60 is pressed inward against the action of the spring 61 until the pins 69 are free from the recesses 68 in which they are engaged. Now by turning the hand wheel 60 the sleeve 48 is rotated and the box 36 participates in this movement because of the engagement of the square end 47 of the sleeve in the square recess 46 of the plate 41. As soon as the box 36 has turned a quarter turn then the pins 69 will engage the other set of recesses 68 and spring 61 will cause them to snap into the said recesses thus locking the box 46 in the new position. The distance between the pins 66 is such that the operator after pushing the wheel 60 inward to release the box 46 has but to rotate said wheel until the pin 65 engages the other pin 66, when the parts will snap into place without effort on the part of the operator.

The plate holding and releasing mechanism of the box 36 is substantially the same as that shown in the aforesaid Letters Patent. On opposite ends of the box 36 are a number of spring fingers 70 and 71, caused to move in opposite directions by the action of cam shafts 72 and 73, the arrangement being such that when the shafts 72 and 73 are rocked on their longitudinal axes cam members thereon will permit one set of spring fingers, say the fingers 70, to move into engagement with the outer plate 37, while the other spring fingers 71 which are inset toward the back of the box 36, the distance of the thickness of a plate will move away from said plate 37. When the shafts 72 and 73 are rocked in the other direction so that the spring fingers 70 and 71 move in reverse directions to that just described, then the outer fingers 70 move out of engagement with the outermost plate 37, and the fingers 71 move into engagement with the next adjacent inner plate, and at the same time wedge members 74 on the fingers 71 force the outermost plate 37 away from the outer edge of the box 36. The next movement of the shafts 72 and 73, which is the return movement of the shafts to their normal position withdraw the fingers 71 from engagement with the then outermost plate 37, while the fingers 70 move into its path before it can be forced out of the box 36 by the action of the spring 39. Consequently the fingers 70 hold the plate in proper position to be in the focal plane of the lens, when the plate holder is brought into coincidence with the opening 7.

In order to rock the shafts 72 and 73 in opposite directions, they are provided with rock arms 75 and 76 respectively. These two rock arms 75 and 76 are connected by links 77 to a rock arm 78 on a rock shaft 79 mounted on the rear face of the back of the box 36, and extending at the other end into close proximity to the plate 41, where the shaft 79 is turned at an angle to form a rock arm 80. When the box 36 is in position on the rod 45 then the rock arm 80 enters one or the other of the recesses 53 in the plate 51. When it is desired to discharge a plate 37 from the box 36, then the hand wheel 58 is grasped and the shaft 57 is given a suitable rotative movement, and this through the crank 56 and link 55 imparts a similar rotative movement to the disk 51. Since the rock arm 80 is engaged in one of the recesses 53 of the disk 51, the shaft 79 has imparted to it a rotative movement which acting upon the rock arm 78 imparts opposite rotative movement to the two shafts 72 and 73 and this will cause the withdrawal of the spring fingers 70 from the front of the outer plate 37 and the insertion of the spring fingers 71 into the path of the next plate, and at the same time the wedges 74 will move the outermost plate 37 sufficiently outward away from the box to free the said plate from said box.

The hand wheel 58 is manipulated only when the plate holder 10 is in position against the end 4 of the board 1, in which position the plate holder is above the dark box 28. The plate 37 which has been discharged from the box 36 now falls upon the gate or door 19 through the slot 18, and the weight of the plate is sufficient to open the door 19 and permit the plate to fall through the slots 23 and 21 into the slot 30 where the lower edge of the plate will engage the door 31 and force it open against the action of the spring 32. The plate continues to fall until it is entirely within the dark box 28 and is ultimately arrested by the cushion 33. Because of the slight slant of the dark box 28 to the vertical, the upper edge of the plate will fall forward until it engages the front 29 of said box leaving the glass side of the plate toward the back of the box 28. As soon as the plate has passed from the plate holder into the dark box the doors 19 and 31 immediately close and so exclude any light from both the dark box and the plate holder. The plate holder is now moved into coincidence with the axis of the lens and another exposure is made after which the plate holder may be moved back into position to discharge the second plate into the dark box, and this plate in falling will engage with its lower edge the glass side of the plate first inserted into the dark box and slide down the same until arrested by the cushion 33, when the upper edge of the plate will gravitate over against the first plate, thus bringing the film side of the plate against the glass side of the preceding plate, and presenting the glass side of the second plate to the film side of the next succeeding plate, and so on.

Assuming that the plate holder is charged with say a dozen unexposed plates, then the photographer may make a dozen exposures one after the other with the magazine of plates and discharge the exposed plates immediately after the exposure and in the order of exposure into the dark box 28. When the entire magazine of plates is exhausted then the dark box 28 may be removed from the camera and taken to the dark room for development and the plate holder may also be removed from the camera and taken to the dark room for refilling.

In order that the magazine may be readily loaded the spring fingers 70 at one end of the magazine box 36 are under the control of a rock shaft 81 having cam members 82 which will engage back of the spring fingers 70, while a handle 83 permits the rocking of this shaft at will. By this means the fingers 70 which are normally in the path of the plates 37 or the follower 38 when the plates are all exhausted, may be moved out of the path of the plates so that spring 39 will force the follower they may be readily inserted when desired.

The spring 34 of the dark box 28 serves to direct the upper ends of all the plates received toward the removable side 29 so that their glass sides are always presented to incoming plates.

A number of magazines may be provided for each plate holder so that plates of different sizes may be used. For instance, if a plate holder be shaped to carry a magazine for 5 by 7 plates, then it will take a magazine for 4 by 5 plates, or magazines for any other plates smaller than 5 by 7. A plate holder for any particular size of plate will take magazines for any smaller size of plate.

What is claimed is:

1. In a photographic camera, a sliding back therefor, a removable magazine plate holder adapted to said sliding back and movable therewith into and out of the optical axis of the camera, and a removable dark box for receiving exposed plates from the plate holder and attachable to the back of the camera at a point below the line of travel of the plate holder at the limit of the travel of the latter away from the optical axis of the camera.

2. In a photographic camera, a sliding back therefor, a removable magazine plate holder adapted to said sliding back and movable therewith into and out of the optical axis of the camera, and a removable dark box for receiving exposed plates from the plate holder and attachable to the back of the camera at a point below the line of travel of the plate holder at the limit of the travel of the latter away from the optical axis of the camera, the said dark box being set at an angle to the plate holder.

3. In a photographic camera, a sliding back therefor, a removable magazine plate holder adapted to said sliding back and movable therewith into and out of the optical axis of the camera, and a dark box for receiving exposed plates from the plate holder and detachably suspended from the back of the camera below the same at the limit of travel of the plate holder away from the optical axis of the camera, the said dark box being set at an angle to the plate holder so as to be at an angle to the vertical when the plate holder is vertical.

4. A photographic camera having a fixed back extended to one side of the optical axis of the camera, a sliding back mounted in said fixed back and provided with a focusing screen movable into and out of coincidence with the optical axis of the camera, a removable magazine plate holder adapted to be secured to said sliding back to one side of the focusing screen and movable into and out of the optical axis of the camera, and a dark box removably suspended from the fixed back of the camera, below the same, and below the plate holder when at the limit of its travel away from the optical axis of the camera.

5. In a photographic camera, a magazine plate holder and a dark box below the same and at an angle to the plane of the plate in the magazine, said dark box being so inclined as to direct the film side of each plate received away from the line of travel of the succeeding plate, when entering the said dark box, and means within the dark box and in the path of an incoming plate to direct the latter out of the path of succeeding plates.

6. In a photographic camera, a plate holder, a plate magazine therein rotatable about an axis, releasing means for the plates, a rock shaft carried by the plate carrier or magazine and actuating the plate releasing mechanism, a disk rotatable about the axis of the magazine, a rock shaft extending to the exterior of the plate holder to one side of the axis of the magazine, and a link connection between said rock shaft and the disk.

7. In a photographic camera, a plate holder, a plate magazine interior thereto and adapted to carry a plurality of photographic plates, means for holding the plate magazine in either of two positions 90° degrees apart, a rotatable sleeve carrying said magazine and constituting the axis thereof, means for moving said sleeve in the direction of its longitudinal axis, a spring for maintaining the sleeve in a position to lock the magazine in adjusted positions, and a screw rod extending through the sleeve, and having a threaded end engaging the magazine for locking the same to the sleeve.

8. In a photographic camera, a plate holder, a magazine interior thereto, and rotatable therein to two positions displaced by 90°, a sleeve carrying said magazine and removably attached thereto and constituting the axis of said magazine, said sleeve being movable longitudinally against spring action to cause the unlocking of the magazine for rotation of the latter, means carried by the magazine for the discharge of photographic plates therefrom one at a time, and means for effecting the operation of the discharging means of the magazine comprising a disk mounted on the axial sleeve of the magazine, and provided with recesses displaced 90° apart, a rock shaft carried by the magazine and connected to the plate discharging mechanism said rock shaft having an arm adapted to engage in either of the recesses of the disk, another rock shaft carried by the plate holder and accessible from the exterior thereof, and connections between the last named rock shaft and the disk for rotating the latter to actuate the plate releasing mechanism.

9. In a photographic camera, a magazine plate holder, a dark box for receiving exposed plates and located below the plate holder, means for forcing the plates from the magazine one at a time laterally away from the plate holder, and means for permitting the gravitation of an exposed plate into the dark box below the plate holder.

10. In a photographic camera, a plate holder, a rotatable plate magazine within said holder, a dark box below the plate holder for the reception of the exposed plates, means for the discharge of plates from the magazine in different positions of the latter, and means for permitting the gravitation of discharged plates from the magazine into the dark box.

11. In a photographic camera, a sliding back provided with a focusing screen at one end and means for the reception of a plate holder at the other end, a magazine plate holder adapted to be removably attached to said sliding back, a rotatable plate magazine within the plate holder, said magazine being rotatable to two positions 90° apart, a dark box suspended below the sliding back at a point coincident with the limit of travel of the plate holder away from the optical axis of the camera, means for discharging plates from the plate holder one at a time in either position of the magazine, and means for permitting the gravitation of plates from the plate holder into the dark box.

In testimony that we claim the foregoing as our own, we have hereto affixed our signatures in the presence of two witnesses.

ROBERT J. LONDON.
JAMES A. LONDON.

Witnesses:
E. D. ANTHONY,
ANNA DE BLOIS.